(12) United States Patent
Nakajima et al.

(10) Patent No.: US 10,875,484 B2
(45) Date of Patent: Dec. 29, 2020

(54) AIRBAG DEVICE

(71) Applicant: AUTOLIV DEVELOPMENT AB, Vargarda (SE)

(72) Inventors: Yutaka Nakajima, Yokohama (JP); Hiroya Tabushi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 288 days.

(21) Appl. No.: 15/766,928

(22) PCT Filed: Jul. 27, 2016

(86) PCT No.: PCT/JP2016/071995
§ 371 (c)(1),
(2) Date: Apr. 9, 2018

(87) PCT Pub. No.: WO2017/061163
PCT Pub. Date: Apr. 13, 2017

(65) Prior Publication Data
US 2018/0290616 A1 Oct. 11, 2018

(30) Foreign Application Priority Data
Oct. 9, 2015 (JP) .................................. 2015-201461

(51) Int. Cl.
*B60R 21/203* (2006.01)
*B60R 21/2334* (2011.01)
*B60R 21/239* (2006.01)

(52) U.S. Cl.
CPC .......... *B60R 21/203* (2013.01); *B60R 21/239* (2013.01); *B60R 21/2334* (2013.01)

(58) Field of Classification Search
CPC .. B60R 21/203; B60R 21/2334; B60R 21/239
See application file for complete search history.

(56) References Cited

U.S. PATENT DOCUMENTS 5,529,337 A 6/1996 Takeda et al.
6,419,262 B1 * 7/2002 Fendt .................... B60R 21/231
280/729

(Continued)

FOREIGN PATENT DOCUMENTS

JP H07156740 A 6/1995

OTHER PUBLICATIONS

International Search Report of PCT/JP2016/071995, dated Sep. 27, 2016 (English Translation).

*Primary Examiner* — Drew J Brown
(74) *Attorney, Agent, or Firm* — Dickinson Wright PLLC (57) ABSTRACT

An airbag device which is capable of efficiently suppressing an injury value of an occupant during an emergency. The airbag device 100 includes: an inflator 112 which is installed in a vehicle and which is capable of supplying gas; a main bag 114 which inflates to the front of a seat of the vehicle due to the gas; and an outer bag 116 which inflates so as to surround the main bag 114 due to the gas. The outer bag 116 includes an opening 118 which opens toward an occupant sitting on the seat and which exposes a portion (a rear region 120) of the main bag 114. The outer bag 116 surrounds and presses against the main bag 114, such that the portion of the main bag 114 protrudes from the opening 118 toward the occupant.

13 Claims, 8 Drawing Sheets

(56) References Cited

U.S. PATENT DOCUMENTS

| | | | | |
|---|---|---|---|---|
| 7,210,701 B2* | 5/2007 | Meissner | ............. | B60R 21/231 |
| | | | | 280/729 |
| 9,676,363 B1* | 6/2017 | Deng | ................... | B60R 21/233 |
| 9,758,121 B2* | 9/2017 | Paxton | ................. | B60R 21/205 |
| 9,845,067 B2* | 12/2017 | Morris | ................. | B60R 21/233 |
| 10,589,707 B2* | 3/2020 | Zhang | ................ | B60R 21/2338 |
| 2007/0187932 A1* | 8/2007 | Sekizuka | ............. | B60R 21/233 |
| | | | | 280/730.1 |
| 2018/0354447 A1* | 12/2018 | Nakajima | ............ | B60R 21/203 |

* cited by examiner

AIRBAG DEVICE

CROSS-REFERENCE TO RELATED APPLICATIONS

This application is a 35 U.S.C. § 371 national phase application of PCT International Application No. PCT/JP2016/071995, filed Jul. 27, 2016, which claims the benefit of priority under 35 U.S.C. § 119 to JP 2015-201461, filed Oct. 9, 2015, the contents of which are incorporated herein by reference in their entirety.

FIELD OF THE INVENTION

The present invention relates to an airbag device which restrains an occupant during an emergency.

BACKGROUND

Airbag devices have become almost standard equipment in recent motor vehicles. An airbag device is a safety device which operates during an emergency such as a vehicle collision and which receives and protects an occupant using an airbag cushion that inflates and deploys under gas pressure. Airbag devices come in various types in accordance with installation locations or applications. For example, in order to protect occupants of front seats from impact mainly in the longitudinal (frontal impact) direction, a driver's seat is provided with a front airbag at the center of a steering wheel, while a passenger airbag is provided in the vicinity of a passenger seat, inside an instrument panel or neighboring regions thereof. In addition, in order to protect respective occupants of front and back row seats from a side collision (side impact) or from a subsequently occurring rollover (overturn), a curtain airbag which inflates and deploys along a side window is provided in the vicinity of a ceiling of a wall part, and a side airbag which inflates and deploys to an immediate side of an occupant is provided in a side portion of the seat.

Airbag cushions of various airbag devices may be internally divided into a plurality of spaces depending on a purpose or an installation environment of the airbag devices. For example, in an occupant protection device (a front airbag) described in Japanese Patent Application Laid-Open No. H01-132444, an airbag cushion is constituted by a centrally positioned central gas bag 1 and an outer peripheral gas bag 3 surrounding the central gas bag 1 (referring to the numbering used in the reference document). According to the configuration of described in the above-mentioned prior art reference, it is described that, since a restraining surface which restrains an occupant is enlarged in a flattened manner and becomes a wide area, an occupant can be reliably received.

BACKGROUND

Modern airbag devices are required to be capable of also accommodating irregular collisions and impact such as so-called oblique collisions in which an impact is directed to a vehicle from an obliquely longitudinal direction. In an oblique collision, an occupant contacts an airbag cushion deploying in front of a seat at an irregular angle such as from an oblique direction. In such cases, when a head of the occupant comes into contact with an airbag cushion in front of a seat, a rotation with a neck about an axis when viewed from above may occur on the head. Since such a rotation of the head is likely to become a factor that increases an injury value of the occupant from the perspective of the structure of the human body, there is a demand for preventing such rotations in an efficient manner.

SUMMARY

In consideration of such problems, an object of the present invention is to provide an airbag device which is capable of efficiently suppressing an injury value of an occupant during an emergency.

In order to address the problem described above, a representative configuration of an airbag device according to the present invention includes: an inflator which is installed in a vehicle and which is capable of supplying gas; a main bag which inflates to the front of a seat of the vehicle due to the gas; and an outer bag which inflates so as to surround the main bag due to the gas, wherein the outer bag has an opening which opens toward an occupant sitting on the seat and which exposes a portion of the main bag, and the outer bag surrounds and presses against the main bag, such that the portion of the main bag protrudes toward the seat side from the opening.

According to the configuration described herein, the main bag forms a portion protruding from the opening of the outer bag (a rear region) and a portion other than the rear region (a front region included in the outer bag). In particular, the rear region of the main bag protrudes toward the seat side and is closer to the occupant than the outer bag. Therefore, the main bag described above can come into contact with the occupant earlier than the outer bag.

With the main bag configured as described above, a portion of an entire volume thereof constitutes the rear region which is the earliest to come into contact with the occupant, and a large remaining portion constitutes the front region. When viewing base fabrics of both portions during inflation as curved surfaces, between curvature radii at arbitrary positions of both portions, the rear region has a smaller curvature radius than the front region. At this point, the main bag is inflated by pressure of gas received from one inflator. Therefore, in the rear region which has a relatively small curvature radius, tension of the base fabric is lower than in the front region of which internal pressure is equal to that of the rear region and which has a relatively large curvature radius. In other words, the cushion of the airbag device described above is configured such that the rear region of the main bag having lowest tension protrudes from center.

For example, in oblique collisions or the like, there are cases where the occupant of a driver's seat moves obliquely forward in a vehicle width direction. In this case, in the configuration described above, the head of the occupant first comes into contact with the rear region of the main bag which deploys near the occupant and which has low tension. Subsequently, even when the head of the occupant tries to move obliquely forward therefrom, a load of the head is absorbed by the outer bag inflating on an outer side in the vehicle width direction with respect to the rear region of the main bag and occupant restraint is achieved.

In the restraining process described above, the occupant, and particularly the head thereof, can be received by the rear region of the main bag with low tension in a relatively flexible manner. In addition, the main bag having received the occupant can be supported and a load from the head can be absorbed by the outer bag inflating so as to surround the main bag. Accordingly, a rotation of the head can be suppressed and the occupant can be restrained while holding an injury value to a low value.

The outer bag described above may include a portion of the main bag other than the portion that protrudes from the opening. According to this invention, a configuration is realized in which the occupant is received by the rear region of the main bag with low tension and the main bag is surrounded and supported by the outer bag as described above.

A volume of an inner space of the outer bag may be smaller than a volume of the main bag. According to this configuration, the main bag can be pressed from its periphery by the outer bag and a part of the main bag can be caused to protrude from the opening of the outer bag in an efficient manner.

The airbag device in accordance with this invention may further include a connecting part which is provided at a prescribed location in a valley between the outer bag and the main bag, and which connects the outer bag and the main bag with each other. By providing the connecting part, a depth of the valley between the outer bag and the main bag can be adjusted, and furthermore, since the main bag and the outer bag can be prevented from separating from each other, a posture during occupant restraint can be stabilized.

The airbag device may further include a vent hole which is provided in the vicinity of the inflator in the main bag, and which discharges gas, and the outer bag may be connected to the vent hole and may inflate due to gas supplied from the vent hole.

In the configuration described above, when the occupant comes into contact with the main bag, gas flowing out from the main bag can be sent into the outer bag and discharge of the gas to the outside can be delayed. Therefore, inner pressure of the outer bag can be increased during occupant restraint and movement of the outer bag can be suppressed by supporting the main bag with the outer bag.

The outer bag described above can inflate in a torus shape. Even with this configuration, the outer bag which surrounds the main bag can be realized in an efficient manner.

The main bag described above may inflate in a shape of a rotating body having, as a rotational axis, a prescribed straight line extending from the inflator, and the outer bag may inflate in a shape of a rotating body which surrounds the main bag in the shape of a rotating body and which is concentric with the main bag. For example, a configuration may be implemented in which the main bag inflates in a circular shape as viewed from the seat and the outer bag inflates so as to surround the outside of the circular main bag.

The inflator, the main bag, and the outer bag described above may be stored in a center of a steering wheel of the vehicle. According to this configuration, the airbag device can be implemented as a front airbag.

According to the present invention, an airbag device which is capable of efficiently suppressing an injury value of an occupant during an emergency can be provided.

BRIEF DESCRIPTION OF THE DRAWINGS

FIGS. 1(*a*) and (*b*) are diagrams illustrating an outline of an airbag device according to an embodiment of the present invention.

FIGS. 2(*a*)-(*d*) are diagrams illustrating, from respective directions, a cushion during inflation and deployment shown in FIG. 1(*b*).

FIGS. 3(*a*)-(*c*) are diagrams illustrating a process by which the cushion during inflation and deployment shown in FIG. 1(*b*) restrains an occupant.

FIGS. 4(*a*)-(*c*) are diagrams illustrating a process by which the cushion shown in FIGS. 3(*a*)-(*c*) restrain an occupant as viewed from the rear on a vehicle inner side.

FIGS. 5(*a*)-(*c*) are diagrams illustrating a process by which the cushion shown in FIGS. 3(*a*)-(*c*) restrain an occupant as viewed from the rear on a vehicle outer side.

FIGS. 8(*a*)-(*d*) are diagrams illustrating a second modification of the airbag cushion illustrated in FIGS. 2(*a*)-(*d*).

DETAILED DESCRIPTION

Hereinafter, preferred embodiments of the present invention will be described in detail with reference to the accompanying drawings. Dimensions, materials, specific numerical values, and the like described in the embodiments are simply examples provided for facilitating understanding of the present invention and are not intended to limit the invention unless otherwise noted. Moreover, for elements having functions or configurations which are substantially the same in the present specification and in the drawings, redundant descriptions will be omitted by denoting such elements with same reference signs and, at the same time, elements not directly related to the present invention will not be illustrated.

Figure 1:
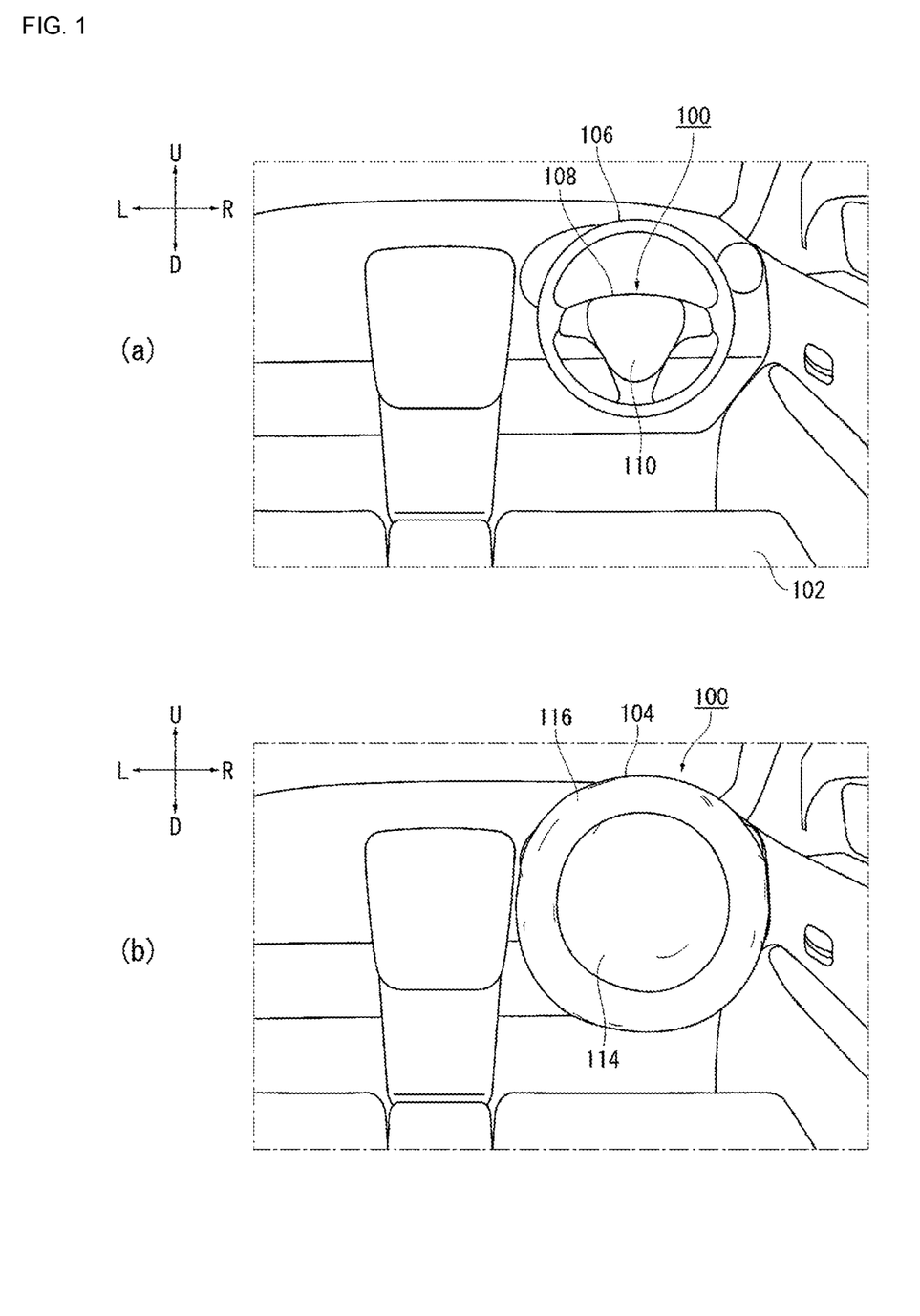

FIGS. 1(*a*)-(*b*) are diagrams illustrating an outline of an airbag device 100 according to an embodiment of the present invention. FIG. 1(*a*) is a diagram illustrating a vehicle before operation of the airbag device 100. In FIG. 1(*a*) and other diagrams, vehicle longitudinal directions are respectively illustrated by arrows F (Forward) and B (Back), vehicle width directions are respectively illustrated by arrows L (Left) and R (Right), and vehicle vertical directions are respectively illustrated by arrows U (up) and D (down).

In the present embodiment, the airbag device 100 is implemented as a frontal airbag for a driver's seat (a front row, right-side seat) in a right-hand drive vehicle. Hereinafter, since a description will be presented with a front row, right-side seat 102 in mind, for example, a vehicle outer side in the vehicle width direction means a right side of the vehicle and a vehicle inner side in the vehicle width direction means a left side of the vehicle.

An airbag cushion (hereinafter, a cushion 104 (refer to FIG. 1(*b*))) of the airbag device 100 is folded, wound, rolled or the like and stored in a storage part 108 provided at center of a steering wheel 106. The storage part 108 is configured to as to include a cover 110, a housing (not illustrated) below the cover 110, and the like.

Figure 2:
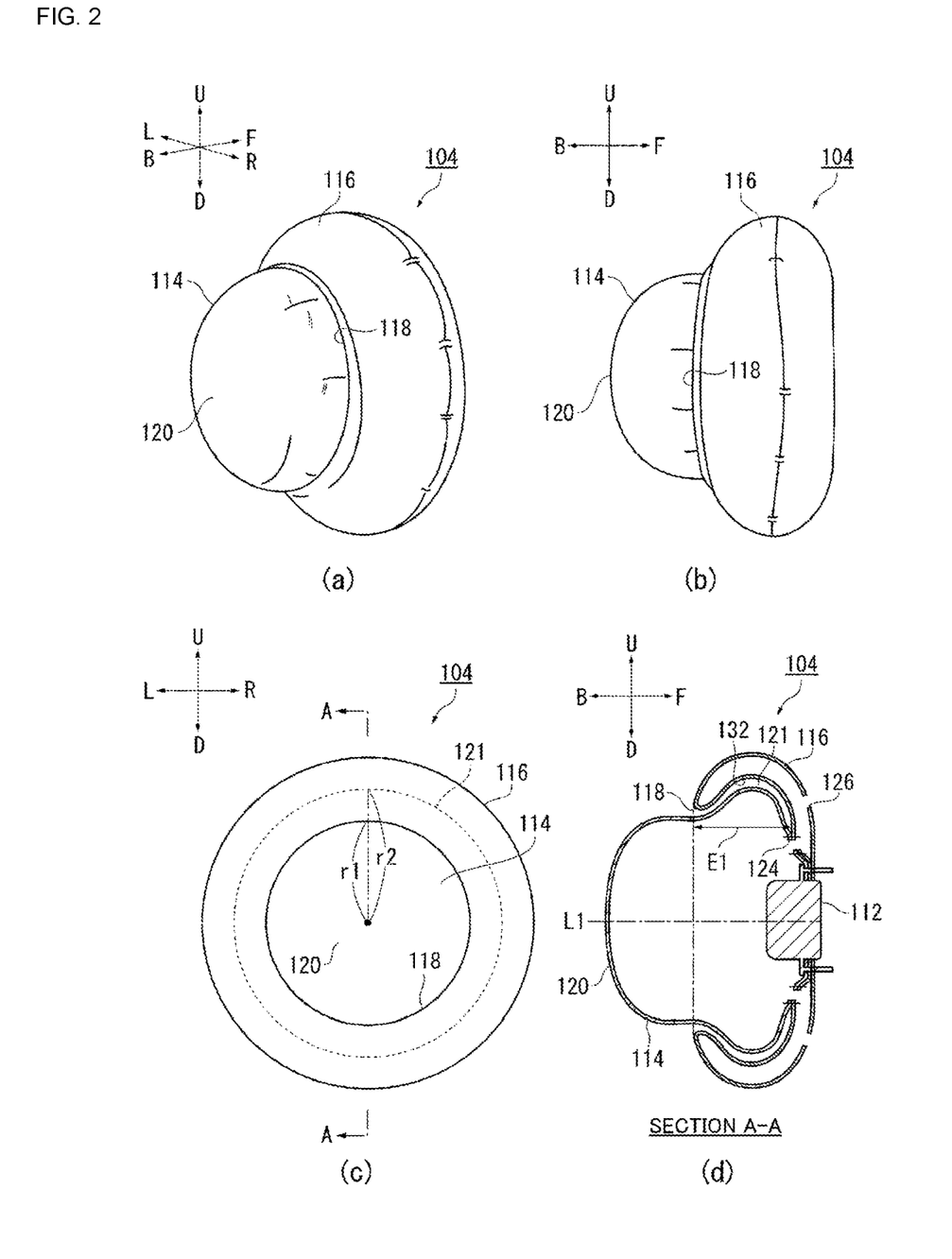

In addition to the cushion 104, the storage part 108 also stores an inflator 112 (refer to FIG. 2(*c*)) which is a gas generating device). The inflator 112 is activated with an impact detection signal sent from a sensor (not illustrated) as a trigger, and supplies gas to the cushion 104 (refer to FIG. 1(*b*)). The cushion 104 starts inflating due to the gas from the inflator 112 and, using inflation pressure thereof, cleaves the cover 110 or the like and inflates and deploys toward the seat 102.

FIG. 1(*b*) is a diagram illustrating the vehicle after inflation and deployment of the cushion 104 of the airbag device 100. The cushion 104 is formed as a bag that inflates three-dimensionally. The cushion 104 is formed by laying a plurality of base fabric constituting a surface thereof one on top of another and sewing, bonding, or spinning and weaving the plurality of base fabric using OPW (One-Piece Woven).

FIGS. 2(a)-(d) are diagrams illustrating, from respective directions, the cushion 104 during inflation and deployment shown in FIG. 1(b). FIG. 2(a) illustrates the cushion 104 shown in FIG. 1(b) as viewed from above on the vehicle outer side. The cushion 104 according to the present embodiment has two parts: a main bag 114 and an outer bag 116.

The main bag 114 is a part constituting a central side of the cushion 104. The main bag 114 inflates forward in a space for an occupant sitting on the seat 102 (refer to FIG. 1(b)) due to the gas from the inflator 112 (refer to FIG. 2(c)), and restrains an upper body and a head of the occupant.

The outer bag 116 is also a part which inflates due to the gas from the inflator 112 (refer to FIG. 2(c)). An opening 118 is provided on a vehicle rearward side of the outer bag 116. The opening 118 opens toward an occupant 128 (refer to FIG. 3(a)) sitting on the seat 102 (refer to FIG. 1(b)), and exposes a portion (a rear region 120) of the main bag 114. The outer bag 116 surrounds the main bag 114 with a portion other than the opening 118. In particular, in the present embodiment, the outer bag 116 surrounds the main bag 114 from left, right, above, and below and from a vehicle forward side thereof.

FIG. 2(b) illustrates the cushion 104 shown in FIG. 2(a) as viewed from the vehicle outer side. The rear region 120 on the vehicle rearward side (a left side in FIG. 2(b)) of the main bag 114 is exposed from the opening 118 of the outer bag 116 and protrudes toward the seat side (the vehicle rearward side). Due to the rear region 120 protruding toward the seat side, the main bag 114 can come into contact with the occupant at an earlier timing. A large remaining portion of the main bag 114 other than the rear region 120 is included in the outer bag 116 as a front region 121 (refer to FIG. 2(d)).

FIG. 2(c) illustrates the cushion 104 as viewed from the vehicle rearward side in a similar manner to FIG. 1(b). The cushion 104 forms an overall circular shape as viewed from the vehicle rearward side which is the seat side. The central main bag 114 also inflates in a circular shape as viewed from the seat side and the outer bag 116 inflates so as to surround the outside of the circular main bag 114.

FIG. 2(d) is an A-A sectional view of the cushion 104 shown in FIG. 2(c). FIG. 2(d) also illustrates the inflator 112 described earlier. The inflator 112 has a disk shape (a platter shape) and is installed inside the storage part 108 of the steering wheel 106 (refer to FIG. 1(a)). Currently widely used inflators include those which are filled by a gas generating agent and which burn the gas generating agent to generate gas, those which are filled with compressed gas and which supply gas without generating heat, and hybrid types which use both combustion gas and compressed gas. Any of these types may be used as the inflator 112.

An imaginary line L1 is a straight line virtually extended from the inflator 112. In the present embodiment, both the main bag 114 and the outer bag 116 are configured as a rotating body having the imaginary line L1 as a rotational axis. The main bag 114 inflates in a rotating body shape having the imaginary line L1 as a rotational axis. The outer bag 116 inflates in a shape of a rotating body which surrounds the main bag 114 and which is concentric with the main bag 114. The outer bag 116 with the rotating body shape includes a portion of the main bag 114 other than the rear region 120 (the portion that protrudes from the opening 118). Moreover, the main bag 114 and the outer bag 116 need not necessarily have rotating body shapes and, for example, a configuration may be adopted in which the rear region 120 is formed at a deviated position with respect to a center of the front region 121.

The main bag 114 and the outer bag 116 both inflate and deploy due to gas from the inflator 112. Gas is supplied to the outer bag 116 from a vent hole (an internal vent 124) provided on the main bag 114.

The internal vent 124 is provided in the vicinity of the inflator 112 on the vehicle forward side (a right side in FIG. 2(d)) in the main bag 114 and discharges gas from the inside of the main bag 114. The outer bag 116 is connected to the internal vent 124 and inflates due to gas received from the internal vent 124. An external vent 126 is provided on the vehicle forward side of the outer bag 116. The external vent 126 discharges gas from the inside of the outer bag 116 to the outside of the cushion 104.

As described above, the rear region 120 of the main bag 114 is exposed from the opening 118 of the outer bag 116 and protrudes toward the side of the occupant (a left side in FIG. 2(d)) sitting on the seat. The protrusion of the rear region 120 of the main bag 114 occurs by the outer bag 116 pressing against the main bag 114.

As illustrated in FIG. 2(c), an inner space of the outer bag 116 from the opening 118 toward the inside of the outer bag 116 (an inner space E1) is set smaller than a size of the main bag 114. In other words, a volume of the inner space E1 of the outer bag 116 is smaller than an entire volume of the main bag 114. According to this configuration, as illustrated in FIG. 2(d), the outer bag 116 efficiently presses against the main bag 114 from a periphery thereof, and the rear region 120 of the main bag 114 which could not fit in the inner space E1 protrudes toward the seat side from the opening 118.

In the present embodiment, a configuration is adopted in which, among the entire cushion 104, a difference is created in tension of a base fabric between the rear region 120 and the other portion of the main bag 114. Specifically, the tension of the base fabric in the central rear region 120 of the main bag 114 is low, and the tension of the base fabric in the front region 121 of the main bag 114 is relatively high.

As illustrated in FIG. 2(d), among an entire volume of the main bag 114, the rear region 120 is one portion and a large remaining portion constitutes the front region 121. As illustrated in FIG. 2(c), when viewing base fabrics of both portions during inflation as curved surfaces, an approximate curvature radius r1 of the rear region 120 at an arbitrary position is smaller than an approximate curvature radius r2 of the front region 121 at an arbitrary position (r1<r2).

Generally, the tension (T) of a base fabric can be expressed by pressure (P) and a curvature radius (r) (T=P×r). The main bag 114 is inflated by pressure of gas received from one inflator 112 (refer to FIG. 2(d)). Therefore, in the rear region 120 which has a relatively small curvature radius r1, the tension of the base fabric is lower than in the front region 121 of which internal pressure is equal to that of the rear region 120 and which has a relatively large curvature radius r2. In other words, the cushion 104 according to the present embodiment is configured such that the rear region 120 of the main bag 114 with the lowest tension protrudes from center.

With the cushion 104 according to the present embodiment, due to the configuration described above, an injury value of an occupant during an emergency can be efficiently suppressed. Hereinafter, a process by which the cushion 104 restrains the occupant will be described with reference to FIGS. 3(a)-(c), 4(a)-(c) and 5(a)-(c).

FIGS. 3(a)-(c) are diagrams illustrating a process by which the cushion 104 during inflation and deployment shown in FIG. 1(b) restrains the occupant 128. Respective figures in FIGS. 3(a)-(c) illustrate a phenomenon that assumes an oblique collision when viewing the cushion 104 and the occupant 128 from above the vehicle. As illustrated in FIG. 3(a), when an impact is generated on the vehicle, the cushion 104 inflates and deploys toward the front of the vehicle with respect to the seat 102 (refer to FIG. 1(b)).

FIG. 3(b) illustrates a moment immediately after the occupant 128 comes into contact with the main bag 114. The occupant 128 in FIG. 3(b) has moved obliquely forward on a vehicle inner side (obliquely downward on the right side in FIG. 3(b)) from the state shown in FIG. 3(a). The rear region 120 of the main bag 114 protrudes toward the side of the occupant sitting on the seat (upward in FIG. 3(b)) and is closer to the occupant 128 than the outer bag 116. Therefore, the rear region 120 of the main bag 114 is the earliest to come into contact with the occupant 128 in the entire cushion 104 including the outer bag 116 and the like.

FIG. 3(c) is a diagram showing the occupant 128 in FIG. 3(b) having further moved obliquely forward on the vehicle inner side (obliquely downward on the right side in FIG. 3(c)). In the present embodiment, the outer bag 116 exists on the outer side of the main bag 114. Therefore, even if the occupant 128 tries to further move after coming into contact with the rear region 120, a load of the occupant 128 is absorbed by the outer bag 116 and movement is suppressed. Due to this effect, a head 130 of the occupant 128 is received and restrained near a valley 132 between the main bag 114 and the outer bag 116 on the outer side of the main bag 114.

As illustrated in FIG. 3(c), as the head 130 enters the valley 132 between the main bag 114 and the outer bag 116, even both temporal regions (a left temporal region 134 and a right temporal region 136) come into contact with the main bag 114 and the outer bag 116 and are restrained.

In the state shown in FIG. 3(c), supposing that only a single grouped cushion other than the cushion 104 exists in front of the occupant 128, when the head 130 of the occupant 128 moving obliquely comes into contact with the cushion, a difference in motion may be created between the head 130 and a shoulder 131 due to friction between the head 130 and the cushion, and a clockwise rotational force with a neck as an axis (a rotational force causing the head 130 to turn left and right with a cervical spine as an axis) as viewed from a vehicle upper side may be created on the head 130 with respect to the shoulder 131 and the like. When such a rotation occurs on the head 130, an injury value of the occupant 128 tends to increase.

In consideration thereof, the present embodiment adopts a configuration in which the head 130 of the occupant 128 is first brought into contact with the rear region 120 of the main bag 114 with low tension, and a load of the head 130 is next absorbed by the outer bag 116 existing on the outer side of the main bag 114 in the vehicle width direction. Accordingly, a motion of the head 130 of the occupant 128 is equalized with a motion of the shoulder 131 and is restrained. In particular, the rotation of the head 130 is minimized with respect to the shoulder 131 and restrained near the valley 132 between the main bag 114 and the outer bag 116. In this manner, in the present embodiment, by significantly reducing or canceling the rotation of the head 130 of the occupant 128 and reducing an angular velocity of the head, the injury value of the occupant 128 accompanying the rotation of the head 130 can be suppressed.

As described with reference to FIG. 2(d), in the present embodiment, gas flowing out from the main bag 114 is sent into the outer bag 116 through the internal vent 124 and subsequently discharged to the outside from the external vent 126 of the outer bag 116. According to this configuration, when the occupant 128 comes into contact with the rear region 120 of the main bag 114, internal pressure of the outer bag 116 can be further increased. For example, the rear region 120 of the main bag 114 flexibly depresses in accordance with the load of the occupant 128, the outer bag 116 protrudes toward the vehicle rearward side as an amount of gas corresponding to the depression enters the outer bag 116 and, as a result, both temporal regions (the left temporal region 134 and the right temporal region 136) of the head 130 can be received near the valley 132 so as to be enclosed by the main bag 114 and the outer bag 116. In addition, by increasing the internal pressure of the outer bag 116, the main bag 114 can be supported by the outer bag 116 and movement of the entire cushion 104 can be suppressed. Furthermore, according to the configuration described above, discharge of gas from the cushion 104 to the outside can be delayed and pressure of the cushion 104 can be retained for a longer period of time.

According to the configurations of the present embodiment described above, in addition to during oblique collisions, high occupant restraining performance can be restrained and an injury value and a movement of an occupant can be suppressed also during ordinary collisions in the vehicle longitudinal direction.

The process by which the cushion 104 restrains the occupant 128 will also be described in a different direction from FIGS. 3(a)-(c) with reference to FIGS. 4(a)-(c) and FIGS. 5(a)-(c). FIGS. 4(a)-(c) are diagrams illustrating the process by which the cushion 104 shown in FIGS. 3(a)-(c) restrain the occupant 128 as viewed from the rear on a vehicle inner side. As illustrated in FIG. 4(a), the main bag 114 inflates and deploys to the front of the occupant 128 moving obliquely forward on the vehicle inner side (leftward in FIG. 4(a)). As illustrated in FIG. 4(b), the head 130 of the occupant 128 (shown here as an anthropometric test device), comes into contact with the rear region 120 of the main bag 114 from near a jaw 138 in a lower part of the head 130. By having the rear region 120 come into contact with the vicinity of the jaw 138, with the present embodiment, a rotation of the head 130 in a direction in which the head 130 falls forward can also be suppressed.

As illustrated in FIG. 4(c), the head 130 of the occupant 128 moving obliquely forward on the vehicle inner side (leftward in FIG. 4(c)) is received near an entrance to the valley 132 by bringing the left temporal region 134 into contact with the outer bag 116. In addition, there may be cases where the head 130 is restrained so as to enter the valley 132. At this point, the main bag 114 and the outer bag 116 also restrain the shoulder 131, a breast, and the like of the occupant 128 in addition to the head 130. Due to these actions, the cushion 104 can equalize motions of the head 130, the shoulder 131, and the like of the occupant 128 and can restrain the occupant 128 while minimizing both a rotation which causes the head 130 to turn left and right with respect to the shoulder 131 and a rotation which causes the head 130 to tilt up and down or left and right. In this manner, the cushion 104 can significantly suppress the injury value of the occupant 128.

Figure 5:
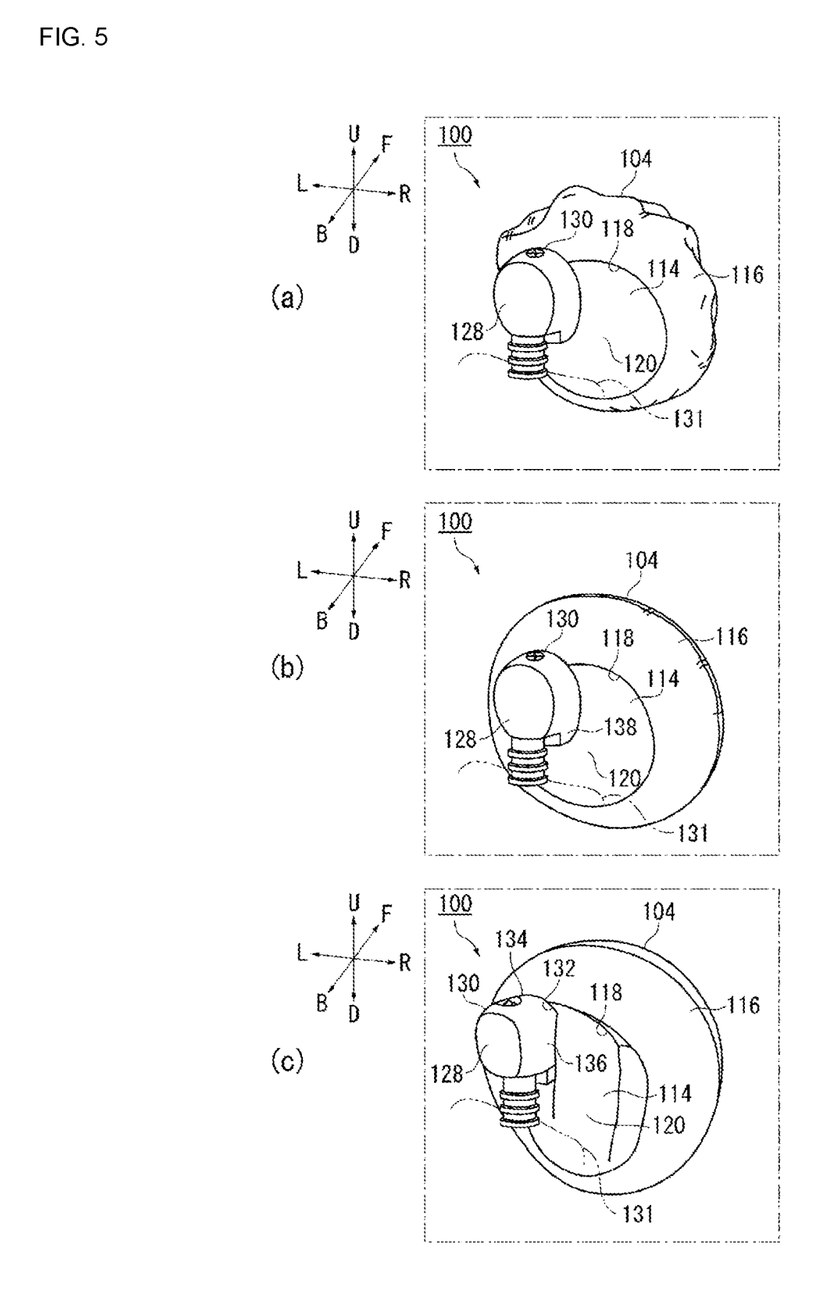

FIGS. 5(a)-(c) are diagrams illustrating the process by which the cushion 104 shown in FIGS. 3(a)-(c) restrain the occupant 128 as viewed from the rear on a vehicle outer side. As illustrated in FIG. 5(a), the main bag inflates and deploys to the front of the occupant 128 moving obliquely forward on the vehicle inner side (slightly obliquely upward on a left side in FIG. 5(*a*)). As illustrated in FIG. 5(*b*), the head 130 of the occupant 128 comes into contact with the rear region 120 of the main bag 114 from the jaw 138 side in the lower part of the head 130.

As illustrated in FIG. 5(*c*), the head 130 brings the left temporal region 134 into contact with the outer bag 116 near the entrance of the valley 132 and is received by further bringing the right temporal region 136 into contact with the flexible main bag 114 which has low tension. Due to these actions, the cushion 104 equalizes motions of the head 130, the shoulder 131, and the like of the occupant 128 and restrains the head 130 while minimizing rotations thereof without causing the head 130 to turn or tilt in any direction with respect to the shoulder 131 and the like.

Due to the configuration described above, the cushion 104 according to the present embodiment can efficiently suppress the injury value of the occupant 128 during an emergency.

Figure 3:
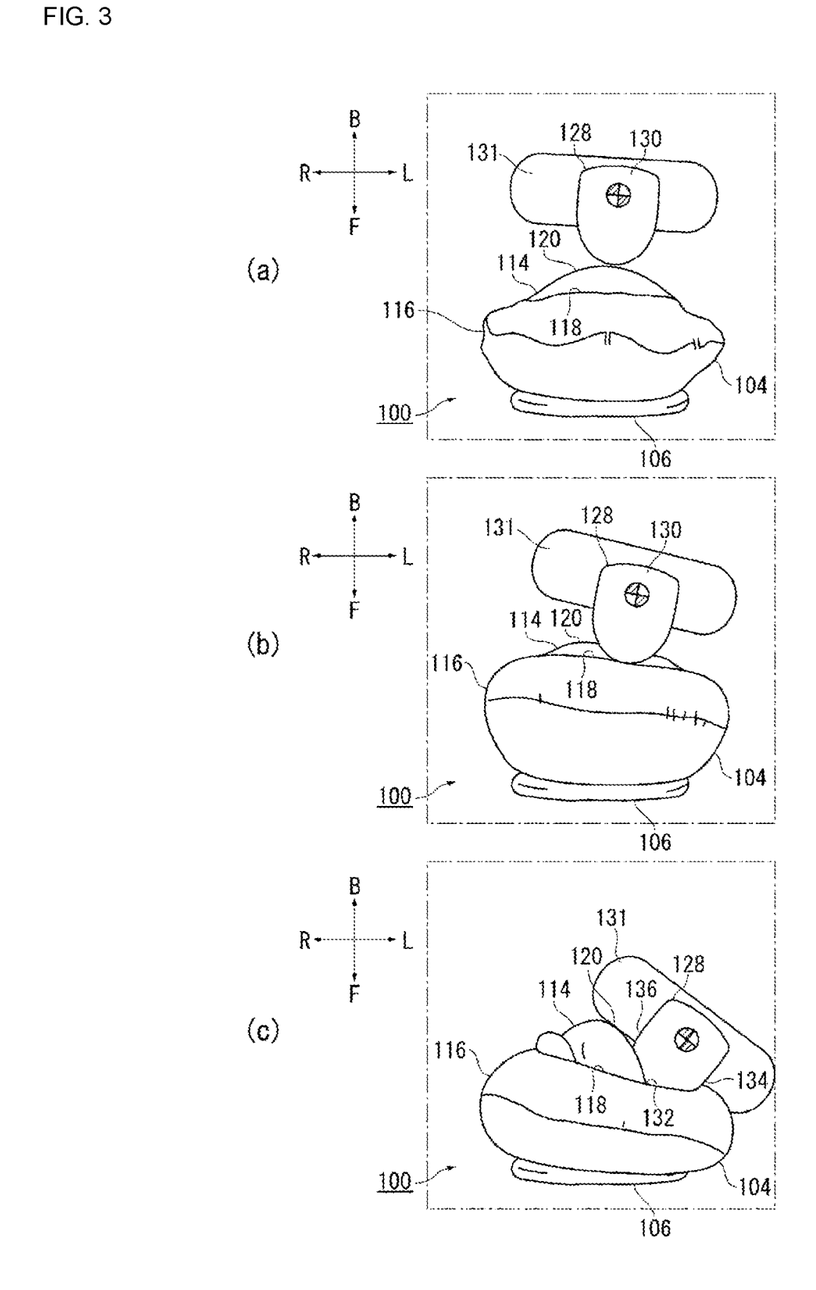

A clockwise rotation has been described above with reference to FIG. 3(*c*) as an example of rotations created on the head 130. However, depending on situations during an emergency, for example, there may be cases where the occupant 128 mores obliquely forward on the vehicle outer side and a counterclockwise rotation centered on the neck as viewed from above is created on the head 130. Even with respect to such a counterclockwise rotation, the cushion 104 according to the present embodiment can use the main bag 114 and the outer bag 116 surrounding the main bag 114 to reduce or cancel the counterclockwise rotation and reduce an angular velocity of the head 130. In other words, the airbag device 100 according to the present embodiment produces similar effects with respect to the occupant 128 moving in any of the vehicle width directions.

Figure 6:
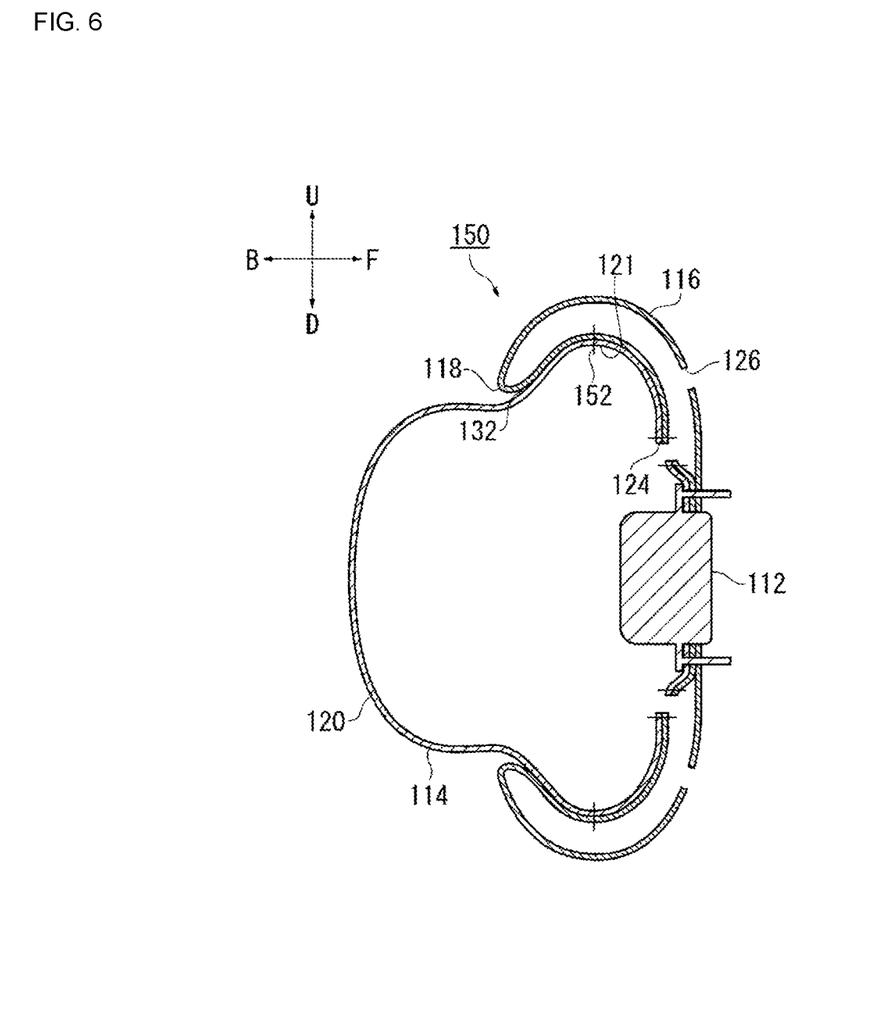
FIG. 6 is a diagram illustrating a first modification of the airbag cushion illustrated in FIG. 2(*d*).

FIG. 6 is a diagram illustrating a first modification of the airbag cushion 104 illustrated in FIG. 2(*d*). Hereinafter, a component that is the same as a component having been already described will be omitted by denoting the component using a same reference sign. In addition, unless otherwise described, a component sharing a same name as a component having been already described is assumed to have a same function as the component having been already described even when denoted by a different reference sign.

A cushion 150 illustrated in FIG. 6 is provided with a connecting part 152 at a prescribed location in the valley 132 between the outer bag 116 and the main bag 114. The connecting part 152 connects the outer bag 116 and the main bag 114 with each other by stitching or the like. For example, in the cushion 150, the connecting part 152 is provided at center in the vehicle longitudinal direction of the front region 121 of the outer bag 116. Providing the connecting part 152 enables a depth and the like of the valley 132 between the main bag 114 and the outer bag 116 to be adjusted.

Figure 4:
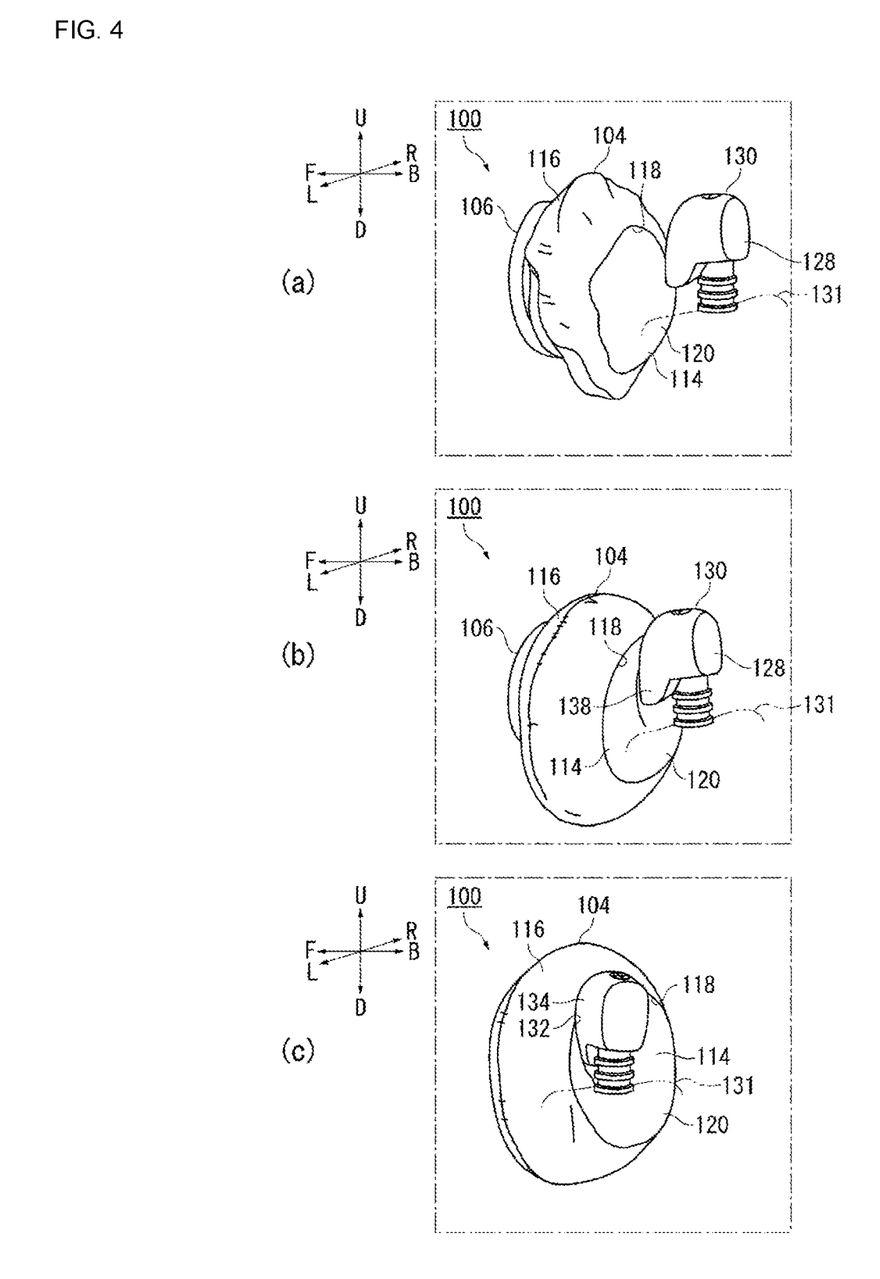

In the present embodiment, the head 130 of the occupant 128 is restrained near the valley 132 as described with reference to FIG. 4(*c*) and the like. In the cushion 150, since the main bag 114 and the outer bag 116 are connected with each other by the connecting part 152, the head 130 of the occupant 128 can be restrained at a shallower position of the valley 132. In other words, adjusting the depth of the valley 132 at the connecting part 152 also means adjusting a degree of interference of the outer bag 116 with respect to the left temporal region 134 (refer to FIG. 4(*c*)). In addition, by providing the valley 132 with the connecting part 152, the main bag 114 and the outer bag 116 can be prevented from separating from each other and a posture of the entire cushion 150 during occupant restraint can be further stabilized.

Figure 7:
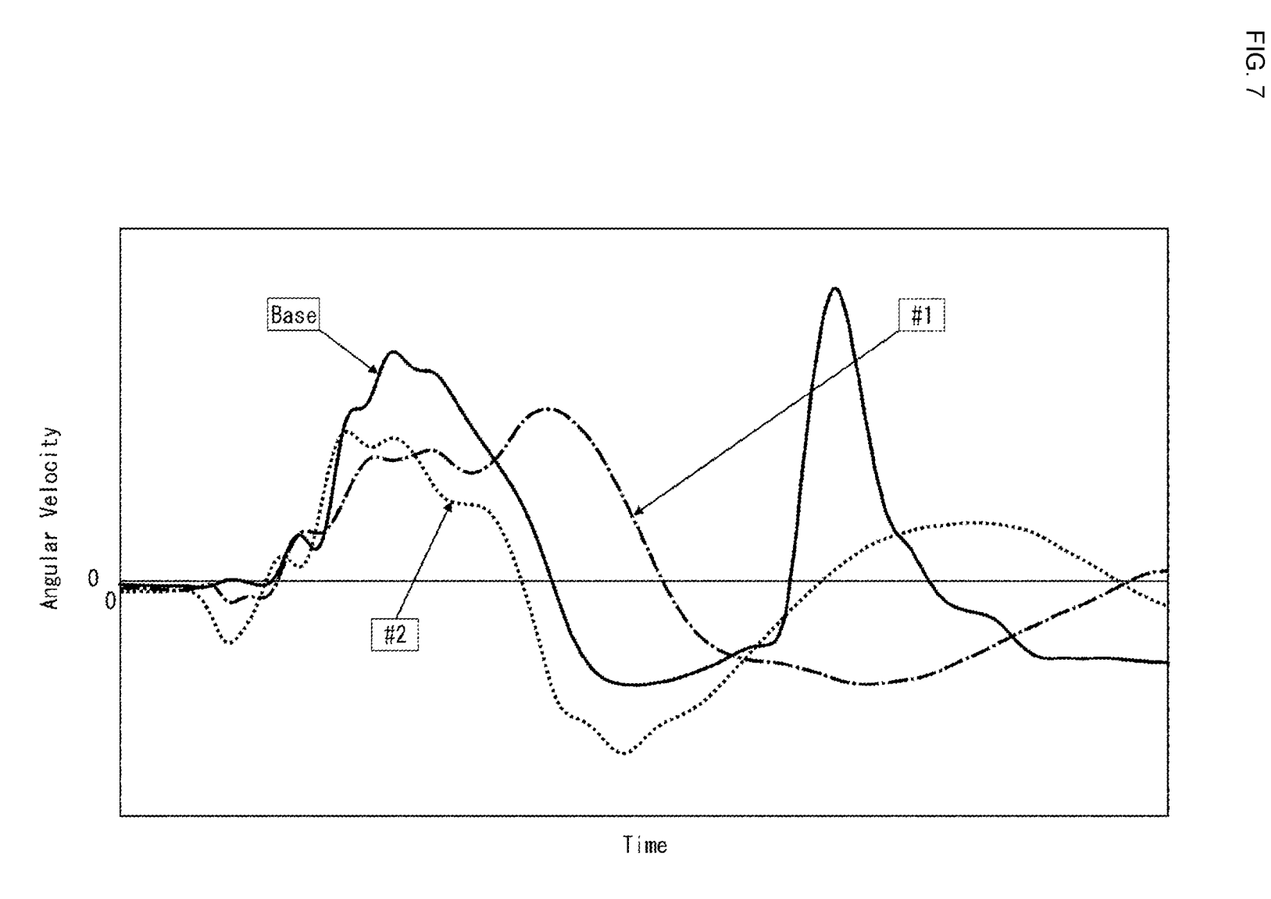
FIG. 7 is a diagram illustrating a result of an evaluation test of the cushions shown in FIGS. 2(*a*)-(*d*) and FIG. 6.

An example of an evaluation test of the cushions 104 and 150 described above will now be described. FIG. 7 is a diagram illustrating a result of an evaluation test of the cushions 104 and 150 shown in FIGS. 2(*a*)-(*d*) and FIG. 6. A vertical axis represents an angular velocity of a head of a dummy and a horizontal axis represents time. The test was performed by bringing the head of the dummy into contact with each cushion from an oblique direction.

A sample labeled as "Base" represents a comparative example using a single grouped cushion. A first peak in an angular velocity of Base represents an angular velocity immediately after contact of the dummy. Subsequently, the angular velocity temporarily declines and a second peak appears after a short while. The second peak represents an angular velocity when movement of the dummy stops.

A sample labeled as "#1" represents a practical example of the cushion 104 illustrated in FIGS. 2(*a*)-(*d*). In #1, although a first peak appears at approximately the same time as Base, a value of the first peak is lower than that of Base. In addition, a second peak such as that of Base does not appear in #1. This reveals that, in #1, the head can be restrained more flexibly than in Base and, at the same time, the head can be restrained without causing any rotation.

A sample labeled as "#2" represents a practical example of the cushion 150 illustrated in FIG. 6. In #2, similarly, a value of the first peak is lower than that of Base. In addition, similarly, a second peak such as that of Base does not appear. This reveals that #2 also enables the head to be restrained more flexibly than in Base and, at the same time, enables the head to be restrained without causing any rotation.

The evaluation test shown in FIG. 7 also reveals that the cushions 104 and 150 according to the respective embodiments described above are capable of efficiently suppressing an injury value of the occupant 128 during an emergency.

Figure 8:
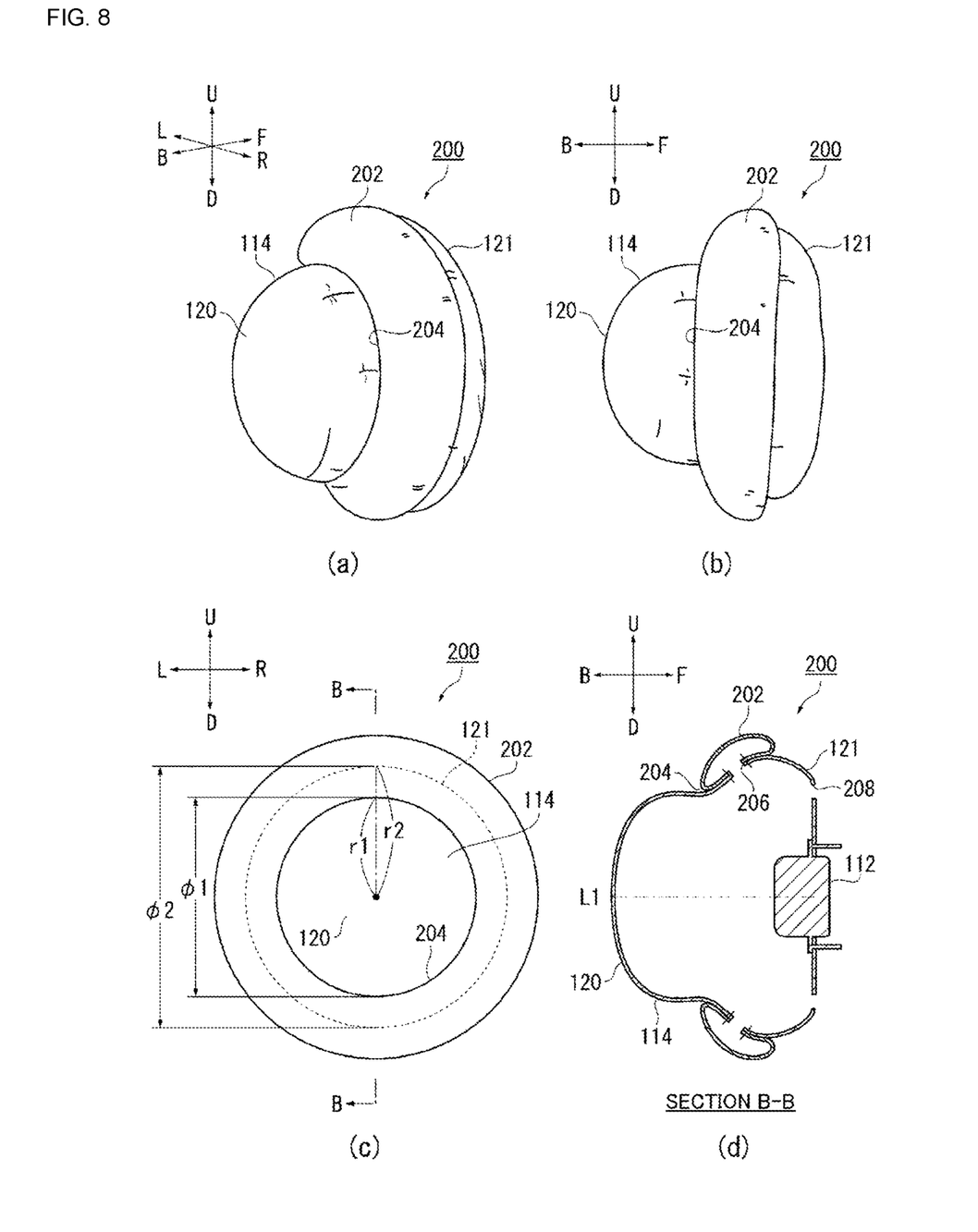

FIGS. 8(*a*)-(*d*) are diagrams illustrating a second modification of the airbag cushion 104 illustrated in FIGS. 2(*a*)-(*d*). FIG. 8(*a*) illustrates a cushion 200 as viewed from above on the vehicle outer side. In the cushion 200, an outer bag 202 is configured to inflate in a torus shape.

The outer bag 202 is also a part which inflates due to gas. The outer bag 202 annularly surrounds a prescribed location of the main bag 114 from above, below, left, and right. An opening 204 at center of the outer bag 202 opens toward the side of the occupant 128 (refer to FIG. 3(*a*)) sitting on the seat 102 (refer to FIG. 1(*b*)), and exposes the rear region 120 of the main bag 114. A portion (the front region 121) of the main bag 114 other than the rear region 120 has one part thereof surrounded by the outer bag 202 and a remaining part exposed toward a vehicle forward side from the outer bag 202.

FIG. 8(*b*) illustrates the cushion 200 shown in FIG. 8(*a*) as viewed from the vehicle outer side. The rear region 120 on the vehicle rearward side of the main bag 114 is exposed from the opening 204 of the outer bag 202 and protrudes toward the seat side (the vehicle rearward side).

FIG. 8(*c*) illustrates the cushion 200 as viewed from the vehicle rearward side. The torus-shaped outer bag 202 inflates so as to surround a prescribed location of the circular main bag 114. An inner diameter Ø1 of the opening 204 of the outer bag 202 as viewed from a passenger seat side is set smaller than an outer diameter Ø2 of a largest location of the main bag 114 as also viewed from the passenger seat side (Ø1<Ø2). Accordingly, a portion of the main bag 114 is pressed as though tightened by the opening 204 of the outer bag 202 and the rear region 120 is formed.

FIG. 8(d) is a B-B sectional view of the cushion 200 shown in FIG. 8(c). The outer bag 202 also inflates in a shape of a rotating body which has the imaginary line L1 as a rotational axis and which is concentric with the main bag 114.

The outer bag 202 is connected to a vent hole 206 provided on the main bag 114 and receives gas through the main bag 114. The main bag 114 is also provided with another vent hole 208, and gas is discharged to the outside through the vent hole 208.

As illustrated in FIG. 8(c), even in the cushion 200, an approximate curvature radius r1 of the rear region 120 is smaller than an approximate curvature radius r2 of the front region 121 (r1<r2). In addition, in the rear region 120 which has a relatively small curvature radius r1, tension of a base fabric is lower than in the front region 121 of which internal pressure is equal to that of the rear region 120 and which has a relatively large curvature radius r2.

In a similar manner to the cushion 104 described with reference to FIGS. 3(a)-(c) to FIGS. 5(a)-(c), in the cushion 200, the head 130 of the occupant 128 is first brought into contact with the rear region 120 of the main bag 114 with low tension, and a load of the head 130 can be next absorbed by the outer bag 202 inflating on the outer side of the main bag 114 in the vehicle width direction. In addition, motions of the head 130, the shoulder 131, and the like of the occupant 128 are equalized, and the head 130 can be restrained while minimizing rotations thereof (in particular, rotations causing the head 130 to turn left and right with the cervical spine as an axis) near the valley 210 between the main bag 114 and the outer bag 202 without causing the head 130 to turn or tilt with respect to the shoulder 131 and the like.

The airbag device 100 has been implemented as a frontal airbag for a driver's seat in the description given above. However, the airbag device 100 can be installed at locations other than the driver's seat. For example, by providing the airbag device 100 on a rear side of a front seat, the airbag device 100 can be implemented as a frontal airbag which inflates and deploys to the front of a rear seat.

While preferred practical examples of the present invention have been described above with reference to the accompanying drawings, the embodiments presented above merely represent preferable examples of the present invention and other embodiments can also be performed or implemented using various methods. In particular, unless it is described in the present specification that restrictions apply, the present invention is not restricted to a detailed shape, size, configuration and arrangement, and the like of components illustrated in the accompanying drawings. Furthermore, the expressions and terms in the present specification have been used for explanatory purposes and are not restrictive unless it is specifically described in the present specification that restrictions apply.

While the above description constitutes the preferred embodiment of the present invention, it will be appreciated that the invention is susceptible to modification, variation and change without departing from the proper scope and fair meaning of the accompanying claims.

The invention claimed is:

1. An airbag device for restraining an occupant of a vehicle, comprising:
an inflator adapted to be installed in the vehicle and which is capable of supplying a gas;
a main bag which inflates to the front of a seat of the vehicle due to the gas; and
an outer bag which inflates so as to surround the main bag due to the gas, wherein
the outer bag has an opening which opens toward the occupant sitting on the seat and which exposes a rear portion of the main bag, and the outer bag embraces an outermost perimeter of the main bag, and
the outer bag surrounds and presses against the front portion of the main bag, such that the rear portion of the main bag protrudes in a rearward direction toward the occupant from the opening and the rear portion of the main bag is at a lower tension than the front portion.

2. The airbag device according to claim 1, further comprising, a volume of an inner space of the outer bag is smaller than a volume of the main bag.

3. The airbag device according to claim 1, further comprising, a connecting part which is provided at a prescribed location in a valley between the outer bag and the main bag, and which connects the outer bag and the main bag with each other.

4. The airbag device according to claim 1, further comprising,
a vent hole which is provided in the vicinity of the inflator in the main bag, and which discharges the gas, and
the outer bag is connected to the vent hole and inflates due to the gas received from the vent hole.

5. The airbag device according to claim 4, further comprising, a second vent hole formed in a fabric of the main bag is configured for allowing the inflation gas to be vented outside of the airbag.

6. The airbag device according to claim 1, further comprising, the outer bag inflates in a torus shape.

7. The airbag device according claim 1, further comprising,
the main bag inflates in a shape of a rotating body having, as a rotational axis, a prescribed straight line extending from the inflator, and
the outer bag inflates in a shape of a rotating body which surrounds the main bag in the shape of the rotating body and which is concentric with the main bag.

8. The airbag device according to claim 7, further comprising, the rear portion of the main bag defines a first radius of curvature from the rotational axis and the front portion of the main bag defines a second radius of curvature from the rotational axis such that the first radius is smaller than the second radius.

9. The airbag device according to claim 7, further comprising, the outer bag forming an inner surface in contact with a fabric of the main bag forming the front portion when the airbag is inflated.

10. The airbag device according to claim 9, further comprising, the surface in contact includes a physical connection in the form of a stitching.

11. The airbag device according to claim 1, further comprising, the inflator, the main bag, and the outer bag are stored in a center of a steering wheel of the vehicle.

12. The airbag device according to claim 1, further comprising, the outer bag inflates in a generally torus shape and the main bag inflates in a shape of a rotating body.

13. An airbag device for restraining an occupant of a vehicle, comprising:
an inflator adapted to be installed in the vehicle and which is capable of supplying a gas;

a main bag inflating to the front of a seat of the vehicle due to the gas and in a shape of a rotating body having, as a rotational axis, a prescribed straight line extending from the inflator; and
an outer bag inflating so as to surround the main bag due to the gas, wherein
the outer bag has an opening which opens toward the occupant sitting on the seat and exposes a rear portion of the main bag, and the outer bag encloses a front portion of the main bag,
the rear portion of the main bag defines a first radius of curvarture from the rotational axis and the front portion of the main bag defines a second radius of curvature from the rotational axis such that the first radius is smaller than the second radius, and
the outer bag surrounds and presses against the front portion of the main bag, such that the rear portion of the main bag protrudes in a rearward direction toward the occupant from the opening.

* * * * *